United States Patent
Kim, II et al.

(10) Patent No.: US 8,660,043 B2
(45) Date of Patent: Feb. 25, 2014

(54) COMMUNICATION APPARATUS TO SUPPORT MULTIBAND COMMUNICATION

(75) Inventors: Young Kim, II, Suwon-si (KR); In Sang Song, Osan-si (KR); Duck Hwan Kim, Goyang-si (KR); Chul Soo Kim, Hwaseong-si (KR); Jea Shik Shin, Hwaseong-si (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 12/903,341

(22) Filed: Oct. 13, 2010

(65) Prior Publication Data

US 2011/0085476 A1  Apr. 14, 2011

(30) Foreign Application Priority Data

Oct. 14, 2009 (KR) .................. 10-2009-0097511

(51) Int. Cl.
*H04L 5/00* (2006.01)

(52) U.S. Cl.
USPC .......................................... 370/297; 370/277

(58) Field of Classification Search
USPC .............. 370/297; 455/73; 330/126; 333/133
See application file for complete search history.

(56) References Cited

U.S. PATENT DOCUMENTS

| | | | |
|---|---|---|---|
| 2006/0111056 A1 | 5/2006 | Dutta | |
| 2007/0046395 A1* | 3/2007 | Tsutsumi et al. | 333/133 |
| 2007/0178862 A1 | 8/2007 | Winters et al. | |
| 2007/0243832 A1* | 10/2007 | Park et al. | 455/73 |
| 2007/0298838 A1 | 12/2007 | Meiyappan et al. | |
| 2010/0157858 A1* | 6/2010 | Lee et al. | 370/297 |
| 2011/0210787 A1* | 9/2011 | Lee et al. | 330/126 |

FOREIGN PATENT DOCUMENTS

| | | |
|---|---|---|
| KR | 10-2006-0026713 | 3/2006 |
| KR | 10-2008-0063213 | 7/2008 |

* cited by examiner

*Primary Examiner* — Albert T Chou
(74) *Attorney, Agent, or Firm* — NSIP Law (57) ABSTRACT

A communication apparatus to support multiband communication is provided. The communication apparatus may be applicable to, for example, a duplexer module for the multiband communication. The communication apparatus may be manufactured to be small and light by simplifying a circuit structure of the duplexer module.

16 Claims, 6 Drawing Sheets

COMMUNICATION APPARATUS TO SUPPORT MULTIBAND COMMUNICATION

CROSS-REFERENCE TO RELATED APPLICATION(S)

This application claims the benefit under 35 U.S.C. §119 (a) of Korean Patent Application No. 10-2009-0097511, filed on Oct. 14, 2009, in the Korean Intellectual Property Office, the entire disclosure of which is incorporated herein by reference for all purposes.

BACKGROUND

1. Field

The following description relates to a communication apparatus to support a multiband communication that may be applicable to, for example, a duplexer module for a plurality of frequency bands.

2. Description of Related Art

In a communication apparatus such as a mobile terminal and the like, a number of circuits constituting a radio frequency (RF) module generally increase based on a multi-function and multiband tendency.

A duplexer module may be connected to an antenna, and may perform a function of supporting a two-way communication by separating a transmit frequency and a receive frequency.

Regardless of the multi-function and multiband tendency, miniaturization and/or and less weight may be desired for a communication apparatus. Accordingly, it may also be desirable to miniaturize and/or provide a lighter weight duplexer module for supporting a multiband communication.

Figure 1:
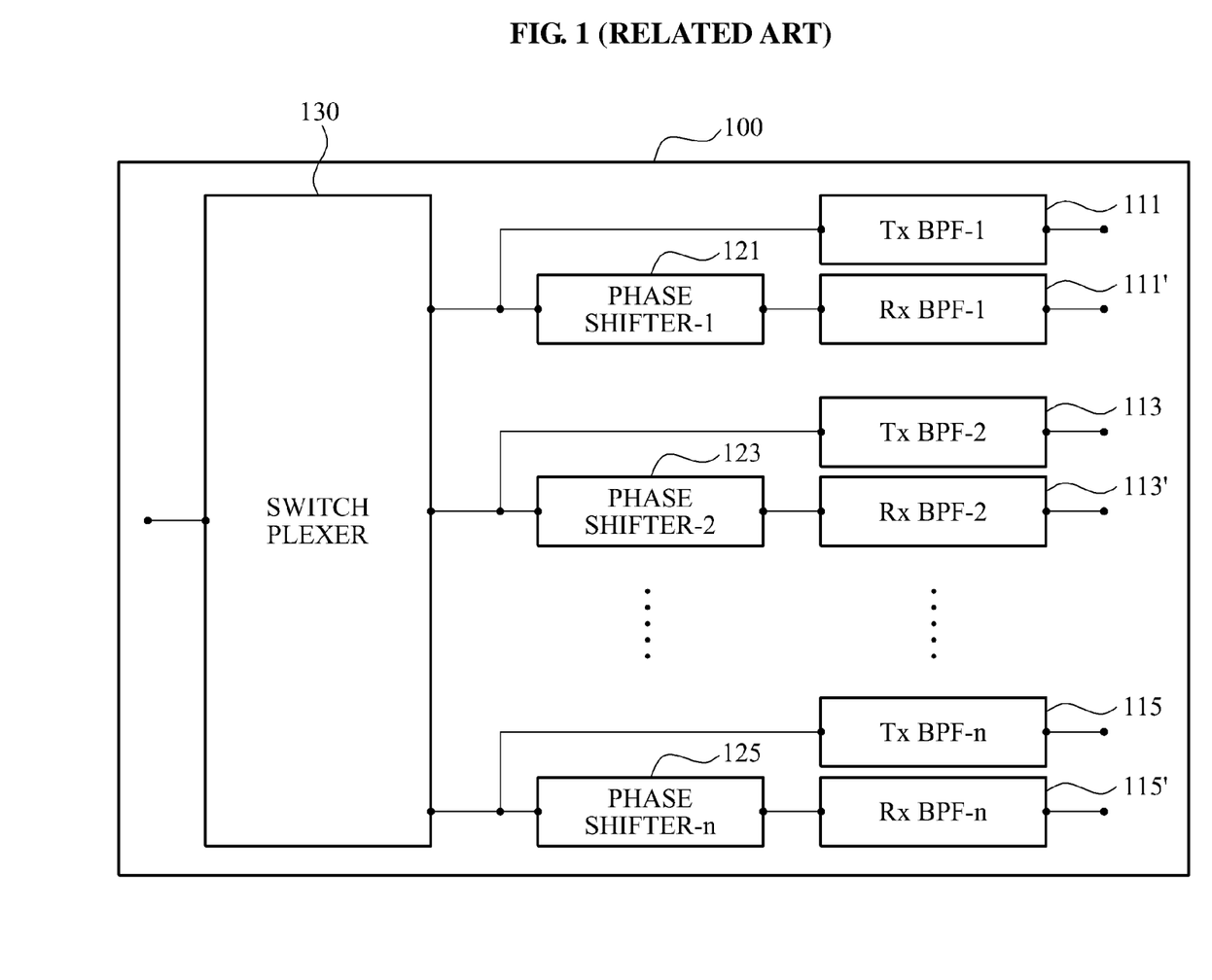
FIG. 1 is a diagram illustrating an example of a communication apparatus for supporting a multiband communication according to a related art.

FIG. 1 illustrates a communication apparatus 100 for supporting a multiband communication method according to a related art.

Referring to FIG. 1, the communication apparatus 100 includes a plurality of transmission signal filters (Tx BPF-1, Tx BPF-2, Tx BPF-n) 111, 113, and 115, a plurality of received signal filters (Rx BPF-1, Rx BPF-2, Rx BPF-n) 111', 113', and 115', a plurality of phase shifters 121, 123, and 125, and a switch plexer 130.

Each of the transmission signal filters (Tx BPF-1, Tx BPF-2, Tx BPF-n) 111, 113, and 115 may include a band pass filter for filtering a transmission signal generated for each band. Each of the received signal filters (Rx BPF-1, Rx BPF-2, Rx BPF-n) 111', 113', and 115' may include a band pass filter for filtering a signal received for each band. Each of the phase shifters 121, 123, and 125 may shift a phase of the transmission signal to separate a transmit frequency and a receive frequency for each band.

As shown in FIG. 1, a number of elements used for the communication apparatus 100 may be a number of supportable equal to 3x+1.

SUMMARY

In one general aspect, there is provided a communication apparatus to support a multiband communication, the communication apparatus comprising a transmission signal filtering unit to filter n multiband transmission signals, wherein n denotes a natural number, a first path setting unit to transfer one or more of the n multiband transmission signals to an antenna unit, a phase shifter to separate the one or more multiband transmission signals and multiband received signals by shifting a phase of the multiband transmission signals transferred to the antenna unit, and a second path setting unit to connect the phase shifter to n received signal filters.

The second path setting unit may comprise (n−1) matching circuits for matching of a radio frequency (RF) signal.

A first terminal of the phase shifter may be connected to the first path setting unit, a second terminal of the phase shifter may be connected to a first received signal filter from among the n received signal filters, a first terminal of a first matching circuit from among the (n−1) matching circuits may be connected to the second terminal of the phase shifter, a second terminal of the first matching circuit from among the (n−1) matching circuits may be connected to a second received signal filter from among the n received signal filters, a first terminal of an (n−1)$^{th}$ matching circuit from among the (n−1) matching circuits may be connected to the second terminal of the phase shifter, and a second terminal of the (n−1)$^{th}$ matching circuit from among the (n−1) matching circuits may be connected to an n$^{th}$ received signal filter from among the n received signal filters.

The second path setting unit may comprise (n−1) transmission lines to transfer a multiband received signal to one of the n received signal filters.

A first terminal of the phase shifter may be connected to the first path setting unit, a second terminal of the phase shifter may be connected to a first received signal filter from among the n received signal filters, a first terminal of a first transmission line among the (n−1) transmission lines may be connected to the second terminal of the phase shifter, a second terminal of the first transmission line among the (n−1) transmission lines may be connected to a second received signal filter from among the n received signal filters, a first terminal of an (n−1)$^{th}$ transmission line among the (n−1) transmission lines may be connected to the second terminal of the phase shifter, and a second terminal of the (n−1)$^{th}$ transmission line among the (n−1) transmission lines may be connected to an n$^{th}$ received signal filter from among the n received signal filters.

The second path setting unit may comprise a switching unit comprising (n+1) terminals to connect the phase shifter to the n received signal filters.

A first terminal of the phase shifter may be connected to the first path setting unit, a second terminal of the phase shifter may be connected to a first terminal of the switching unit comprising the (n+1) terminals, a second terminal of the switching unit comprising the (n+1) terminals may be connected to a first received signal filter from among the n received signal filters, and an (n+1)$^{th}$ terminal of the switching unit comprising the (n+1) terminals may be connected to an n$^{th}$ received signal filter from among the n received signal filters.

In another aspect, there is provided a communication apparatus for supporting a multiband communication, the communication apparatus comprising a first module to perform a duplexer function of a first frequency band, and a second module to perform a duplexer function of a second frequency band, wherein the first module comprises a first module transmission signal filtering unit to filter L multiband transmission signals, wherein L denotes a natural number, a first module first path setting unit to transfer one of the L multiband transmission signals to a first module antenna unit, a first module phase shifter to separate multiband transmission signals and multiband received signals by shifting a phase of the multiband transmission signal transferred to the first module antenna unit, and a first module second path setting unit to connect the first module phase shifter to L first module received signals filters, and the second module comprises a second module transmission signal filtering unit to filter M multiband transmission signals, wherein M denotes a natural number, a second module first path setting unit to transfer one of the M multiband transmission signals to a second module antenna unit, a second module phase shifter to separate multiband transmission signals and multiband received signals by shifting a phase of the multiband transmission signal transferred to the second module antenna unit, and a second module second path setting unit to connect the second module phase shifter to M second module received signals filters The first module second path setting unit may comprise (L−1) matching circuits for matching of an RF signal, and the second module second path setting unit may comprise (M−1) matching circuits for matching of the RF signal.

The first module second path setting unit may comprise (L−1) transmission lines for transmission of a multiband received signal, and the second module second path setting unit may comprise (M−1) transmission lines for transmission of the multiband received signal.

The first module second path setting unit may comprise a first module switching unit comprising (L+1) terminals for connecting the first module phase shifter and the L received signal filters, and the second module second path setting unit may comprise a second module switching unit comprising (M+1) terminals for connecting the second module phase shifter and the M received signal filters.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

The communication apparatuses described herein may be, for example, a mobile terminal, a personal computer, a laptop computer, and the like.

Figure 2:
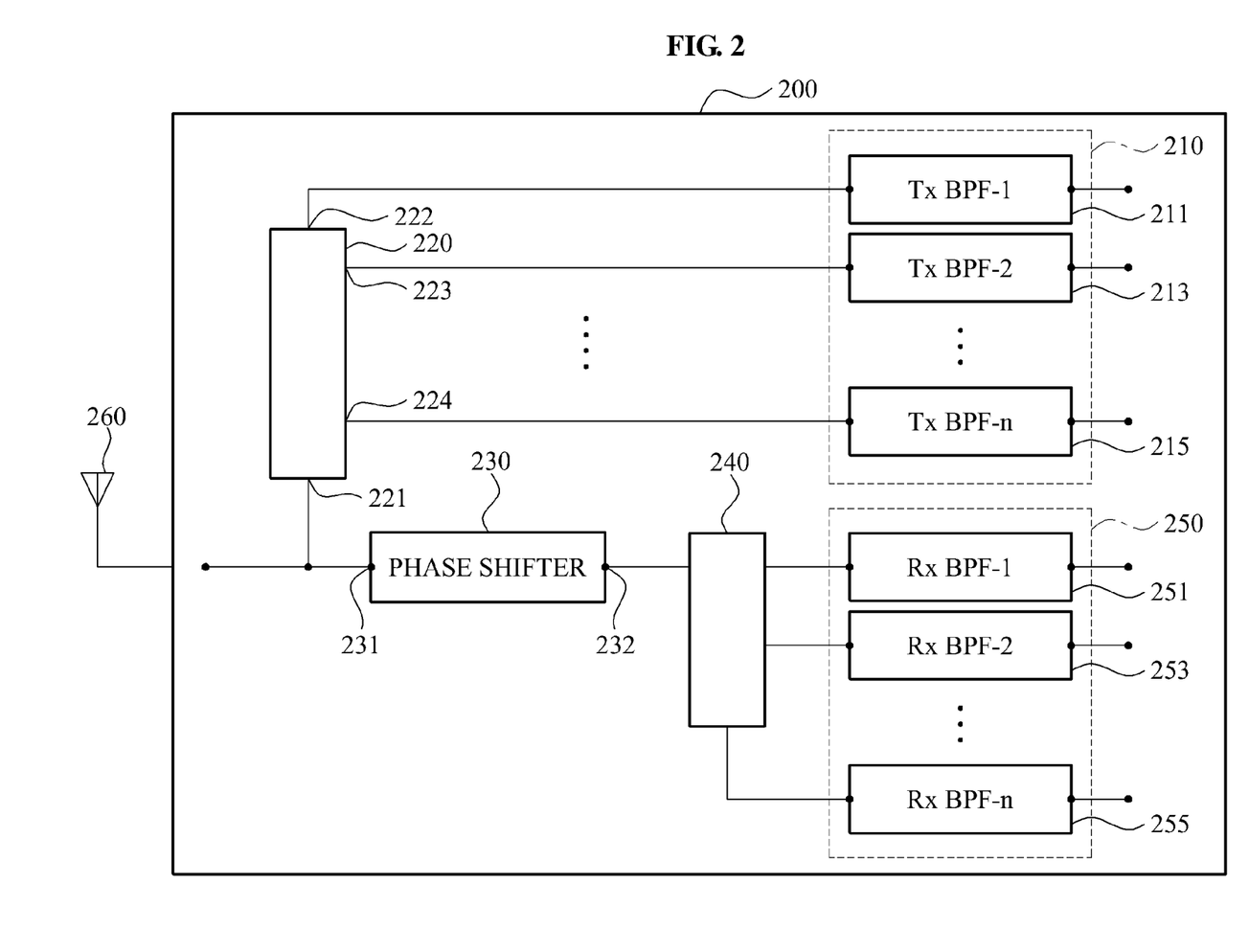
FIG. 2 is a diagram illustrating an example of a communication apparatus.

FIG. 2 illustrates an example of a communication apparatus.

Referring to FIG. 2, the communication apparatus 200 includes a transmission signal filtering unit 210, a first path setting unit 220, a phase shifter 230, a second path setting unit 240, a received signal filtering unit 250, and an antenna unit 260.

The transmission signal filtering unit 210 may filter 'n' number of multiband transmission signals. In this example, 'n' denotes a natural number. The transmission signal filtering unit 210 may include a plurality of band pass filters, for example, a first transmission signal filter (Tx BPF-1) 211, a second transmission signal filter (Tx BPF-2) 213, and an $n^{th}$ transmission signal filter (Tx BPF-n) 215, each of which filter a transmission signal generated for a respective band. For example, the first transmission signal filter (Tx BPF-1) 211 may filter a transmission signal of a first band, the second transmission signal filter (Tx BPF-2) 213 may filter a transmission signal of a second band, and the $n^{th}$ transmission signal filter (Tx BPF-n) 215 may filter a transmission signal of an $n^{th}$ band.

The first path setting unit 220 may transfer one of the 'n' multiband transmission signals to the antenna unit 260. For example, the first path setting unit 220 may be configured as a switch, and may transfer one of the 'n' multiband transmission signals to the antenna unit 260 based on a control signal provided from a controller (not shown).

In this example, a first terminal 221 of the first path setting unit 220 may be connected to a first terminal 231 of the phase shifter 230. A second terminal 222 of the first path setting unit 220 may be connected to the first transmission signal filter (Tx BPF-1) 211. A third terminal 223 of the first path setting unit 220 may be connected to the second transmission signal filter (Tx BPF-2) 213. An $n^{th}$ terminal 224 of the first path setting unit 220 may be connected to the $n^{th}$ transmission signal filter (Tx BPF-n) 215.

As an example, the phase shifter 230 may be a wideband phase shifter, and may separate multiband transmission signals and multiband received signals by shifting the phase of the multiband transmission signal transferred to the antenna unit 260. For example, the phase shifter 230 may prevent mutual interference between a transmission signal and a received signal by shifting the phase of the multiband transmission signal transferred to the antenna unit 260. The phase shifter 230 may include one or more inductors and/or one or more capacitors. The phase shifter 230 may generate a phase difference between the multiband transmission signal and the multiband received signal. The generated phase difference may be, for example, 90 degrees, 85 degrees, 75 degrees, 60 degrees, 40 degrees, and the like.

The first terminal 231 of the phase shifter 230 may be connected to the first path setting unit 220. A second terminal 232 of the phase shifter 230 may be connected to the second path setting unit 240.

The second path setting unit 240 may connect the phase shifter 230 to 'n' number of received signal filters. The second path setting unit 240 may be configured as a matching circuit for matching of a radio frequency (RF) signal, a transmission line for transmission of a multiband received signal, a switch, and the like.

The received signal filtering unit 250 may filter the 'n' number of multiband transmission signals. The received signal filtering unit 250 may include a plurality of band pass filters, for example, a first received signal filter (Rx BPF-1) 251, a second received signal filter (Rx BPF-2) 253, and an $n^{th}$ received signal filter (Rx BPF-n) 255, for filtering a received signal received for each respective band. For example, the first received signal filter (Rx BPF-1) 251 may filter a received signal of a first band, the second received signal filter (Rx BPF-2) 253 may filter a received signal of a second band, and the $n^{th}$ received signal filter (Rx BPF-n) 255 may filter a received signal of an $n^{th}$ band.

The antenna unit 260 may include a plurality of antennas for supporting the multiband communication.

Figure 3:
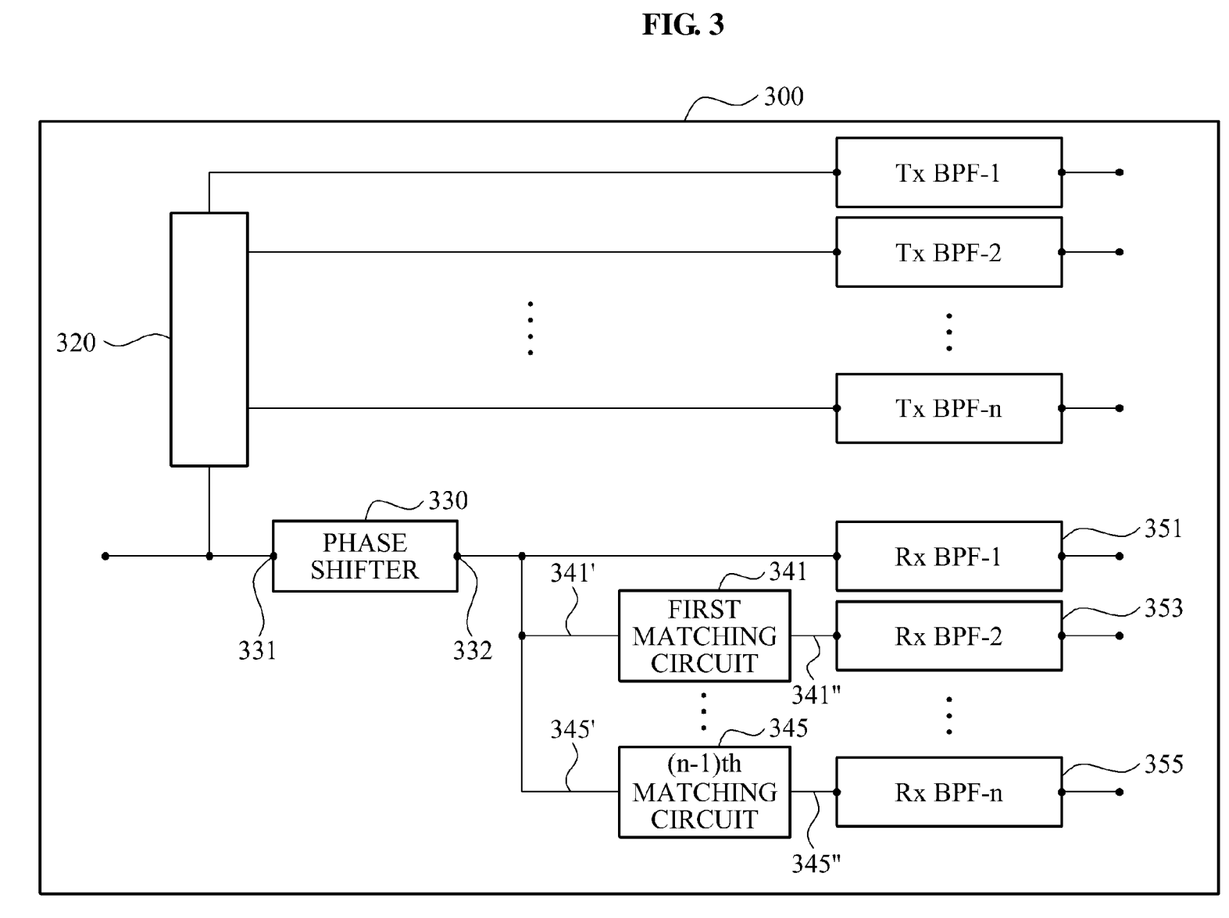
FIG. 3 is a diagram illustrating an example of a second path setting unit of FIG. 2 which is configured as a matching circuit.

FIG. 3 illustrates an example of the second path setting unit 240 of FIG. 2 which is configured as a matching circuit.

Referring to FIG. 3, communication apparatus 300 has a similar configuration as the communication apparatus 200 of FIG. 2 but also includes a plurality of matching circuits. In this example, the second path setting unit 240 shown in FIG. 2 may be configured as (n−1) matching circuits including a first matching circuit 341 and an $(n-1)^{th}$ matching circuit 345. Each of the matching circuits may include an inductor and a capacitor. An inductance and a capacitance may be individually set for each band.

Referring to FIG. 3, for example, a first terminal 331 of a phase shifter 330 may be connected to a first path setting unit 320, and a second terminal 332 of the phase shifter 330 may be connected to a first received signal filter (Rx BPF-1) 351 from among 'n' number of received signal filters.

A first terminal 341' of the first matching circuit 341 from among the (n−1) matching circuits may be connected to the second terminal 332 of the phase shifter 330, and a second terminal 341" of the first matching circuit 341 may be connected to a second received signal filter (Rx BPF-2) 353 from among the 'n' number of received signal filters.

A first terminal 345' of the $(n-1)^{th}$ matching circuit 345 from among the (n−1) matching circuits may be connected to the second terminal 332 of the phase shifter 330, and a second terminal 345" of the $(n-1)^{th}$ matching circuit 345 may be connected to an $n^{th}$ received signal filter (Rx BPF-n) 355 from among the 'n' number of received signal filters.

Figure 4:
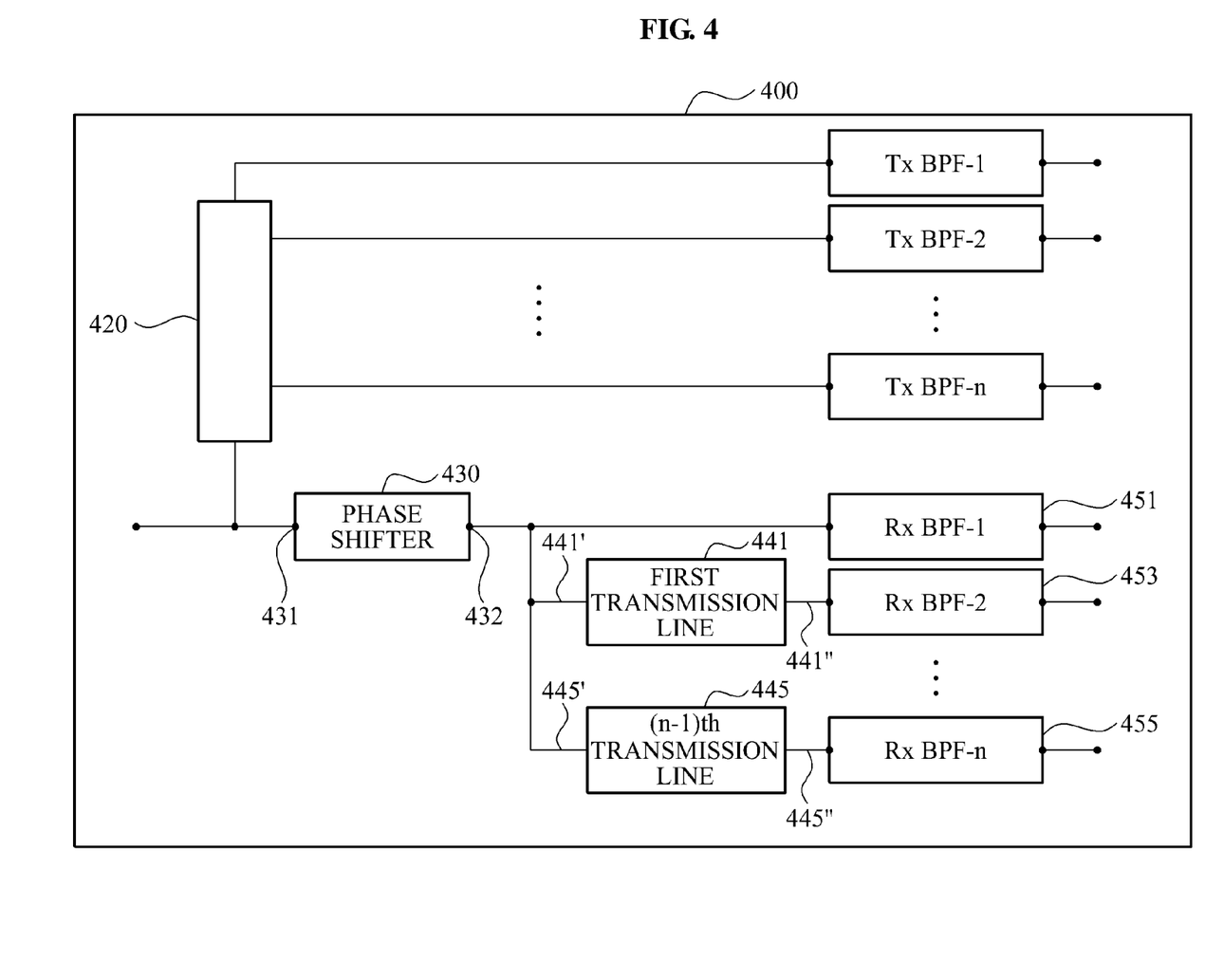
FIG. 4 is a diagram illustrating an example of the second path setting unit of FIG. 2 which is configured as a transmission line.

FIG. 4 illustrates an example of the second path setting unit 240 of FIG. 2 which is configured as a transmission line.

Referring to FIG. 4, communication apparatus 400 has a similar configuration as the communication apparatus 200 of FIG. 2 but also includes a plurality of transmission lines. In this example, the second path setting unit 240 may be configured as (n−1) transmission lines including a first transmission line 441 and an $(n-1)^{th}$ transmission line 445 for transferring a multiband received signal to one of 'n' number of received signal filters.

Referring to FIG. 4, for example, a first terminal 431 of a phase shifter 430 may be connected to a first path setting unit 420, and a second terminal 432 of the phase shifter 430 may be connected to a first received signal filter (Rx BPF-1) 451 from among 'n' number of received signal filters.

A first terminal 441' of the first transmission line 441 from among the (n−1) transmission lines may be connected to the second terminal 432 of the phase shifter 430, and a second terminal 441" of the first transmission line 441 may be connected to a second received signal filter (Rx BPF-2) 453 from among the 'n' number of received signal filters.

A first terminal 445' of the $(n-1)^{th}$ transmission line 445 from among the (n−1) transmission lines may be connected to the second terminal 432 of the phase shifter 430, and a second terminal 445" of the $(n-1)^{th}$ transmission line 445 may be connected to an $n^{th}$ received signal filter (Rx BPF-n) 455 from among the 'n' received signal filters.

Figure 5:
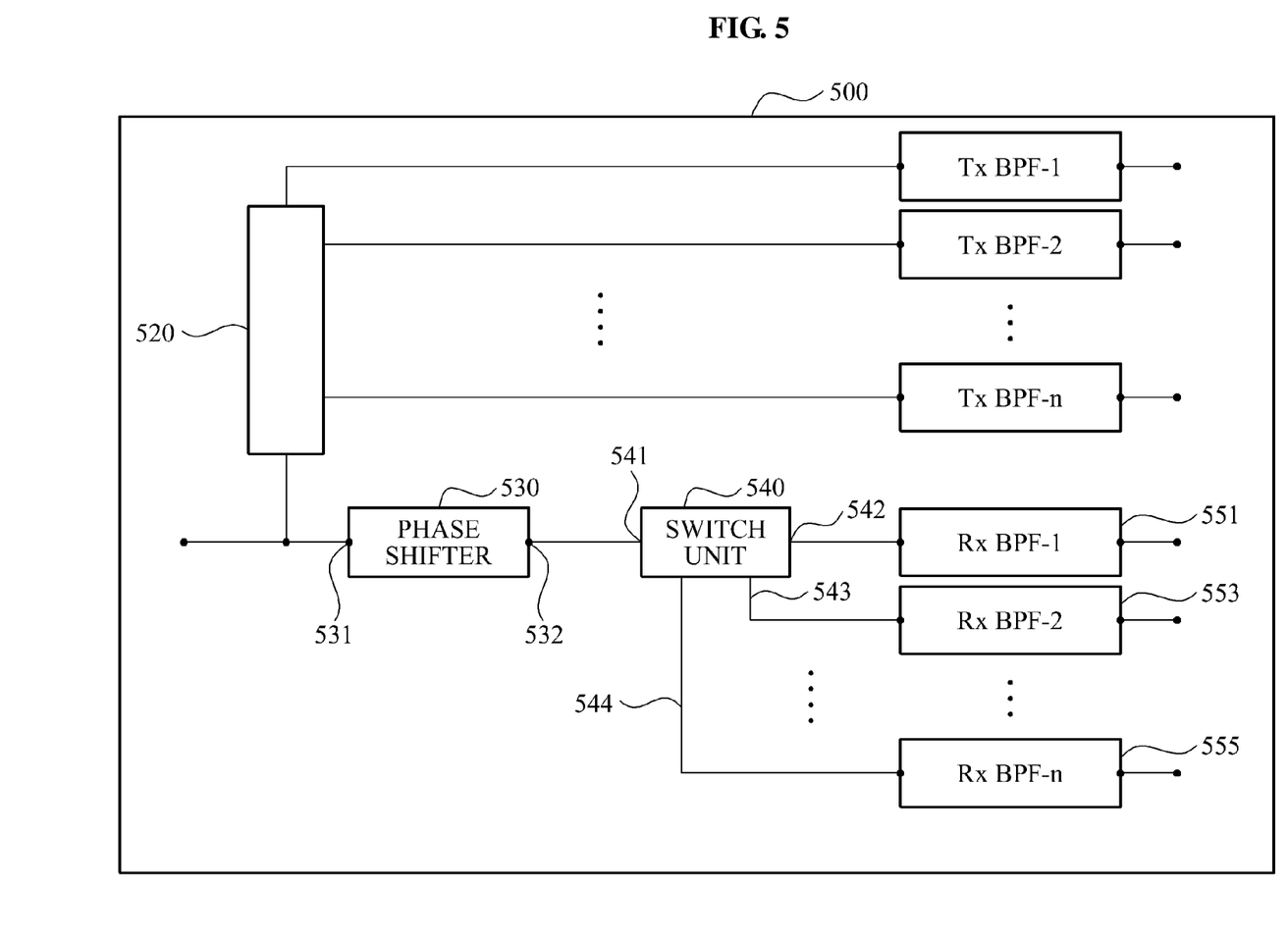
FIG. 5 is a diagram illustrating an example of the second path setting unit of FIG. 2 which is configured as an antenna unit.

FIG. 5 illustrates an example of the second path setting unit 240 of FIG. 2 which is configured as an antenna unit.

Referring to FIG. 5, communication apparatus 500 has a similar configuration as the communication apparatus 200 of FIG. 2 but also includes a switch unit 540 and does not include an antenna. In this example, the second path setting unit 240 may be configured as a switch unit 540 including (n+1) terminals to connect a phase shifter 530 to 'n' number of received signal filters. The switch unit 540 may transfer 'n' number of multiband received signals to one of the 'n' number of received signal filters based on a control signal provided from a controller (not shown).

As an example, a first terminal 531 of the phase shifter 530 may be connected to a first path setting unit 520, and a second terminal 532 of the phase shifter 530 may be connected to a first terminal 541 of the switch unit 540.

A second terminal 542 of the switch unit 540 may be connected to a first received signal filter (Rx BPF-1) 551, a third terminal 543 of the switch unit 540 may be connected to a second received signal filter (Rx BPF-2) 553, and an $(n+1)^{th}$ terminal 544 of the switch unit 540 may be connected to an $n^{th}$ received signal filter (Rx BPF-n) 555.

Figure 6:
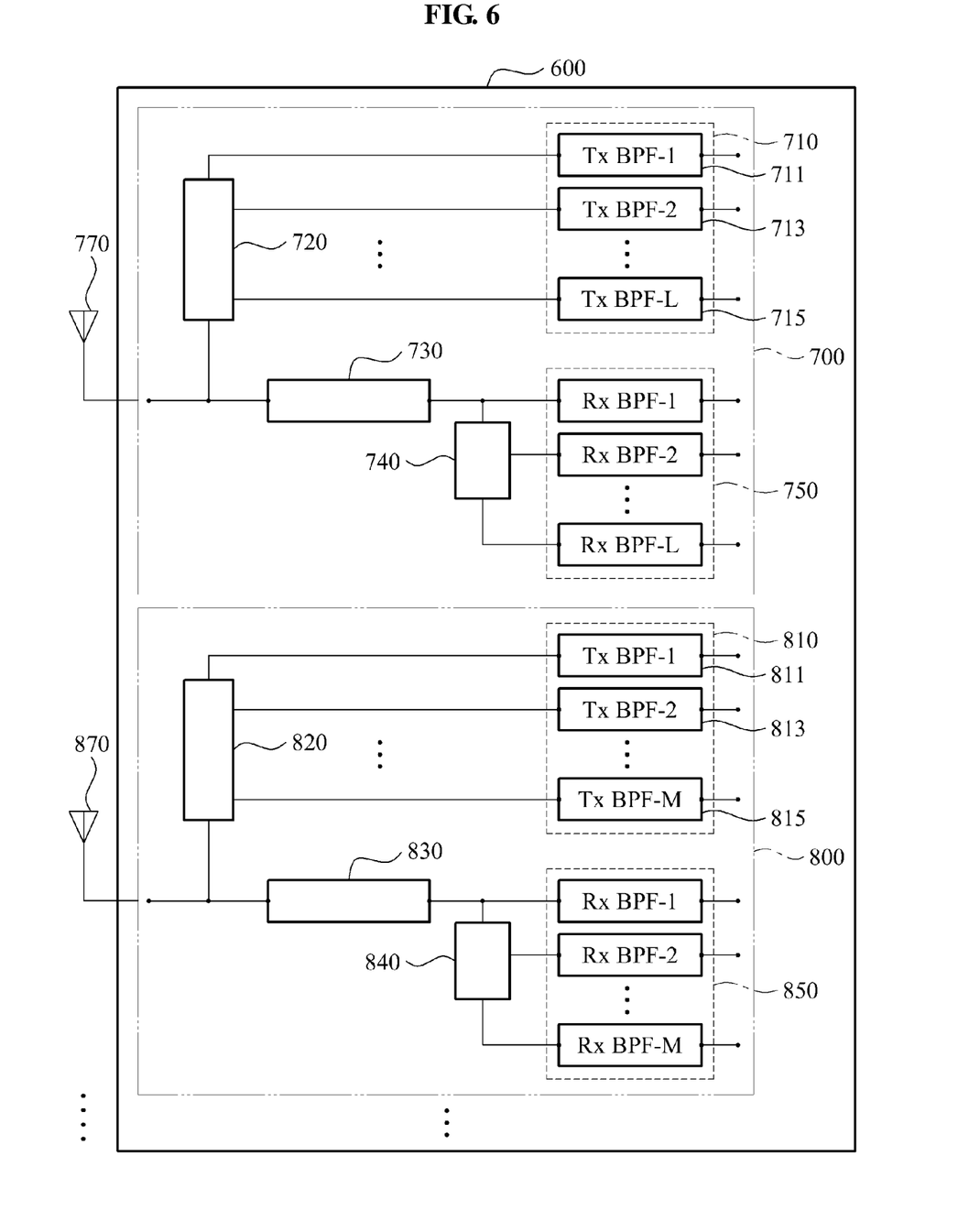
FIG. 6 is a diagram illustrating another example of a communication apparatus.

FIG. 6 illustrates another example of a communication apparatus.

Referring to FIG. 6, communication apparatus 600 includes a plurality of duplexer modules for supporting a multiband communication. Each of the duplexer modules may have the same configuration as any of the communication apparatuses 200, 300, 400, and 500 of FIGS. 2 through 5.

For example, the communication apparatus 600 may include a first module 700 to perform a duplexer function of a first frequency band, and a second module 800 to perform a duplexer function of a second frequency band. The first frequency band may be, for example, a 1 GHz band, and the second frequency band may be, for example, a multi GHz band.

In this example, the first module 700 includes a first module transmission signal filtering unit 710, a first module first path setting unit 720, a first module phase shifter 730, and a first module second path setting unit 740.

The first module transmission signal filtering unit 710 may filter L multiband transmission signals. In this example, L denotes a natural number.

The first path setting unit 720 may transfer one of the L multiband transmission signals to a first module antenna unit 770.

The first module phase shifter 730 may separate multiband transmission signals and multiband received signals by shifting a phase of the multiband transmission signal transferred to the first module antenna unit 770.

The first module second path setting unit 740 may connect the first module phase shifter 730 to L number of first module received signals filters. The first module second path setting unit 740 may be configured as a matching circuit, a transmission line, and a switch unit.

The second module 800 includes a second module transmission signal filtering unit 810, a second module first path setting unit 820, a second module phase shifter 830, and a second module second path setting unit 840.

The second module transmission signal filtering unit 810 may filter M multiband transmission signals. In this example, M denotes a natural number.

The second module first path setting unit 820 may transfer one of the M multiband transmission signals to a second module antenna unit 870.

The second module phase shifter 830 may separate multiband transmission signals and multiband received signals by shifting a phase of the multiband transmission signal transferred to the second module antenna unit 870.

The second module second path setting unit 840 may connect the second module phase shifter 830 to M number of second module received signals filters. In this example, the second module second path setting unit 840 may be configured as a matching circuit, a transmission line, and a switch unit.

Described herein is a communication apparatus for supporting a multiband communication that may be manufactured to be small and light in weight by simplifying a circuit structure of a duplexer module.

Also, in a related art, the number of phase shifters corresponds to the number of to bands used to support the multiband communication, whereas, as described herein, a duplexer module for supporting the multiband communication using a single phase shifter may be used.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication apparatus to support a multiband communication, the communication apparatus comprising:
   a transmission signal filtering unit to filter n multiband transmission signals, wherein n denotes a natural number that includes at least two;
   a first path setting unit to transfer the n multiband transmission signals to an antenna unit, wherein the first path setting unit comprises n terminals to receive the n multiband transmission signals, respectively, and one additional terminal to connect the n multiband transmission signals to the antenna unit and to a phase shifter;
   the phase shifter comprising a first terminal that is connected between the first path setting unit and the antenna unit to receive the n multiband transmission signals, and configured to separate the n multiband transmission signals and multiband received signals by shifting a phase of the n multiband transmission signals that are transferred to the antenna unit; and
   a second path setting unit to connect a second terminal of the phase shifter to n received signal filters.

2. The communication apparatus of claim 1, wherein the second path setting unit comprises (n−1) matching circuits for matching of a radio frequency (RF) signal.

3. The communication apparatus of claim 2, wherein:
   the first terminal of the phase shifter is connected to the first path setting unit,
   the second terminal of the phase shifter is connected to a first received signal filter from among the n received signal filters,
   a first terminal of a first matching circuit from among the (n−1) matching circuits is connected to the second terminal of the phase shifter,
   a second terminal of the first matching circuit from among the (n−1) matching circuits is connected to a second received signal filter from among the n received signal filters,
   a first terminal of an $(n-1)^{th}$ matching circuit from among the (n−1) matching circuits is connected to the second terminal of the phase shifter, and
   a second terminal of the $(n-1)^{th}$ matching circuit from among the (n−1) matching circuits is connected to an $n^{th}$ received signal filter from among the n received signal filters.

4. The communication apparatus of claim 1, wherein the second path setting unit comprises n transmission lines to transfer a multiband received signal to one of the n received signal filters.

5. The communication apparatus of claim 4, wherein:
   the first terminal of the phase shifter is connected to the first path setting unit,
   the second terminal of the phase shifter is connected to a first received signal filter from among the n received signal filters,
   a first terminal of a first transmission line among the (n−1) transmission lines is connected to the second terminal of the phase shifter,
   a second terminal of the first transmission line among the (n−1) transmission lines is connected to a second received signal filter from among the n received signal filters, a first terminal of an $(n-1)^{th}$ transmission line among the (n−1) transmission lines is connected to the second terminal of the phase shifter, and a second terminal of the $(n-1)^{th}$ transmission line among the (n−1) transmission lines is connected to an $n^{th}$ received signal filter from among the n received signal filters.

6. The communication apparatus of claim 1, wherein the second path setting unit comprises a switching unit comprising (n+1) terminals to connect the phase shifter to the n received signal filters.

7. The communication apparatus of claim 6, wherein:
the first terminal of the phase shifter is connected to the first path setting unit,
the second terminal of the phase shifter is connected to a first terminal of the switching unit comprising the (n+1) terminals,
a second terminal of the switching unit comprising the (n+1) terminals is connected to a first received signal filter from among the n received signal filters, and
an $(n+1)^{th}$ terminal of the switching unit comprising the (n+1) terminals is connected to an $n^{th}$ received signal filter from among the n received signal filters.

8. The communication apparatus of claim 1, wherein a plurality of bands from among the n multiband transmission signals are shifted using one phase shifter.

9. A communication apparatus for supporting a multiband communication, the communication apparatus comprising:
a first module to perform a duplexer function of a first frequency band; and
a second module to perform a duplexer function of a second frequency band,
wherein the first module comprises:
a first module transmission signal filtering unit to filter L multiband transmission signals, wherein L denotes a natural number;
a first module first path setting unit to transfer one of the L multiband transmission signals to a first module antenna unit;
a first module phase shifter to separate multiband transmission signals and multiband received signals by shifting a phase of the multiband transmission signal transferred to the first module antenna unit; and
a first module second path setting unit to connect the first module phase shifter to L first module received signals filters, and
the second module comprises:
a second module transmission signal filtering unit to filter M multiband transmission signals, wherein M denotes a natural number;
a second module first path setting unit to transfer one of the M multiband transmission signals to a second module antenna unit;
a second module phase shifter to separate multiband transmission signals and multiband received signals by shifting a phase of the multiband transmission signal transferred to the second module antenna unit; and
a second module second path setting unit to connect the second module phase shifter to M second module received signals filters.

10. The communication apparatus of claim 9, wherein:
the first module second path setting unit comprises (L−1) matching circuits for matching of an RF signal, and
the second module second path setting unit comprises (M−1) matching circuits for matching of the RF signal.

11. The communication apparatus of claim 9, wherein:
the first module second path setting unit comprises (L−1) transmission lines for transmission of a multiband received signal, and
the second module second path setting unit comprises (M−1) transmission lines for transmission of the multiband received signal.

12. The communication apparatus of claim 9, wherein:
the first module second path setting unit comprises a first module switching unit comprising (L+1) terminals for connecting the first module phase shifter and the L received signal filters, and
the second module second path setting unit comprises a second module switching unit comprising (M+1) terminals for connecting the second module phase shifter and the M received signal filters.

13. A communication apparatus, comprising:
a transmission signal filtering unit comprising a plurality of transmission filters configured to filter a plurality of multiband transmission signals;
a first path setting unit configured to transfer the plurality of multiband transmission signals to an antenna, the first path setting unit comprising a plurality of terminals to receive the plurality of multiband transmission signals, respectively, and one additional terminal to connect the plurality of multiband transmission signals to the antenna and to a phase shifter; and
the phase shifter comprising a terminal that is connected between the first path setting unit and the antenna to receive the plurality of multiband transmission signals, and configured to separate the multiband transmission signals and multiband received signals by shifting a phase of the plurality of multiband transmission signals transferred from the first path setting unit to the antenna.

14. The communication apparatus of claim 13, wherein the communication apparatus comprises a single phase shifter that is configured to shift the phase of the plurality of multiband transmission signals in comparison to having multiple phase shifters for each respective band among the multiband transmission signals.

15. The communication apparatus of claim 13, further comprising:
a received signal filtering unit comprising a plurality of receive filters configured to filter a plurality of received multiband signals; and
a second path setting unit disposed between the phase shifter and the received signal filtering unit to connect the phase shifter to the plurality of receive filters.

16. The communication apparatus of claim 13, wherein the plurality of transmission filters comprise n transmission filters, and the first path setting unit comprises (n+1) terminals to connect n multiband transmission signals from the n transmission filters to the phase shifter.

* * * * *